Feb. 23, 1932.   S. B. HASELTINE   1,846,517
FRICTION SHOCK ABSORBING MECHANISM
Filed May 16, 1929
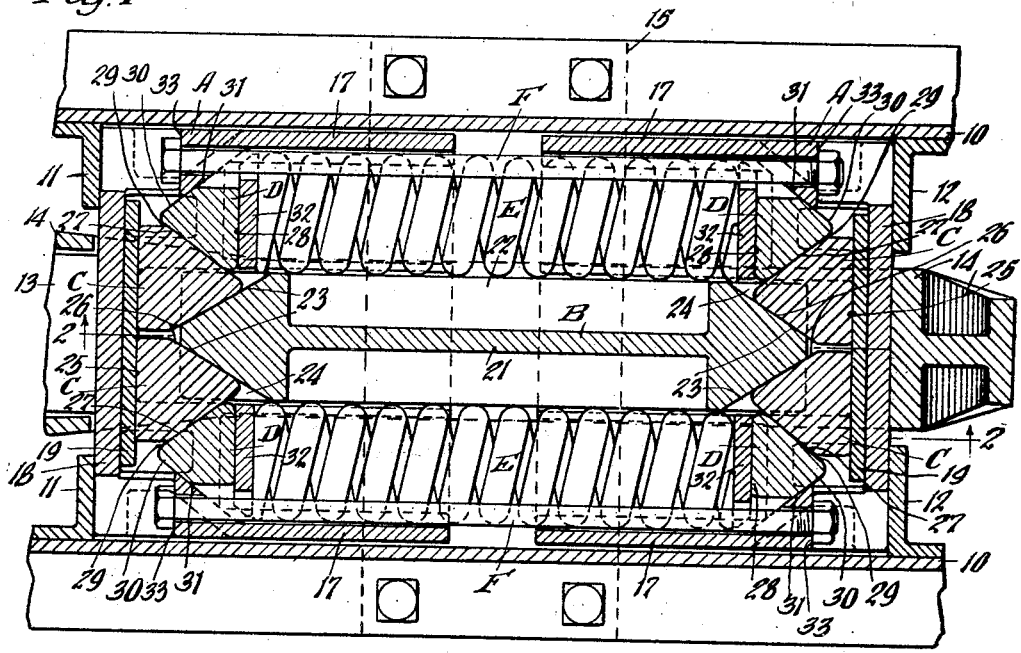
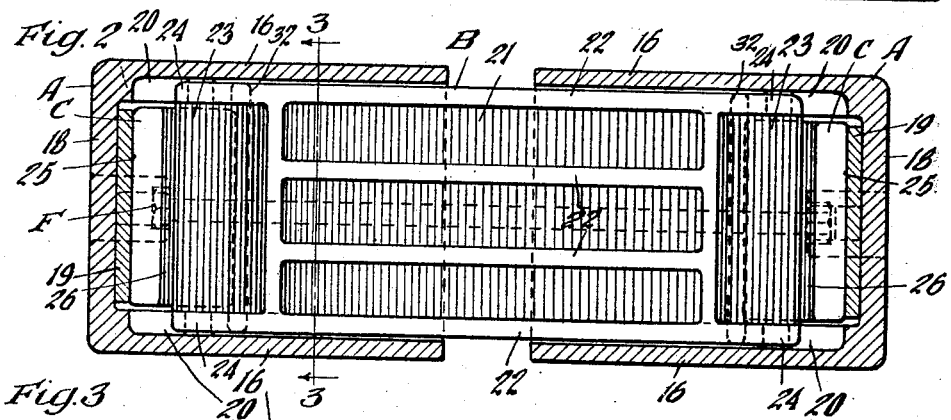
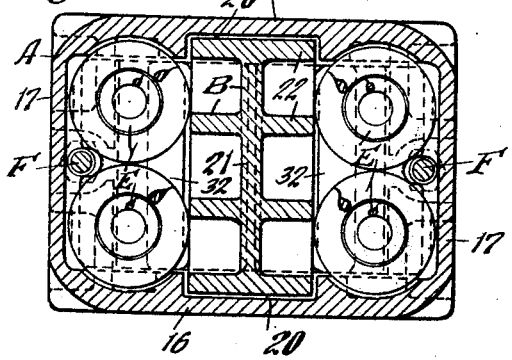
Witness
Wm. Geiger
Inventor
Stacy B. Haseltine
By Joseph Harris
His Atty.

Patented Feb. 23, 1932

1,846,517

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 16, 1929. Serial No. 363,582.

This invention relates to improvements in friction shock absorbing mechanisms.

One object of the invention is to provide a friction shock absorbing mechanism including end followers, a central post, friction wedge means cooperating with the post spring resistance means yieldingly opposing movement of the friction means with respect to the post, a means for holding the parts of the mechanism assembled and of uniform over all length, including retainer rods or bolts so disposed as not to interfere with the friction means and occupying the minimum amount of space.

A further object of the invention is to provide a mechanism of the character indicated of the double ended type, including front and rear follower casings; a central post having wedge means at opposite ends; friction wedge members at opposite ends of the mechanism cooperating with the post and follower casings; spring resistance means opposing movement of the wedge members; retainer means for limiting outward movement of the casings and holding the mechanism assembled, wherein the post, friction wedge members and spring resistance means are all supported by the casings to maintain the proper alinement of the parts.

Another object of the invention is to provide a mechanism of the character indicated in the preceding paragraph wherein cooperating guide means is provided on the post and casings for guiding the post lengthwise of the mechanism.

Other objects of the invention will more clearly appear from the description and claims hereinafter following.

In the drawings, forming a part of this specification, Fig. 1 is a horizontal, longitudinally sectional view through the underframe structure of a railway car, illustrating my improvements in connection therewith. Fig. 2 is a longitudinal vertical sectional view of the shock absorbing mechanism proper, corresponding substantially to the line 2—2 of Fig. 1. And Fig. 3 is a vertical, transverse, sectional view corresponding substantially to the line 3—3 of Fig. 2.

In said drawings 10—10 indicate channel-shaped center or draft sills of a railway car underframe, to the inner sides of which are secured front stop lugs 11—11 and rear stop lugs 12—12. The inner end portion of the coupler shank is designated by 13 and has operatively connected thereto a hooded yoke 14 of well known form. My improved shock absorbing mechanism is disposed within the yoke and the yoke in turn is supported by a detachable saddle plate 15 secured to the bottom flanges of the draft sills.

My improved friction shock absorbing mechanism comprises broadly a pair of follower casings A—A; a column or post B; two pairs of inner friction wedge blocks C—C; two pairs of outer friction wedge blocks D—D; two pairs of main spring resistance elements E—E; and a pair of retainer bolts F—F.

The follower casings A—A are of similar design, each having spaced longitudinally extending top and bottom walls 16—16, longitudinally extending spaced vertical side walls 17—17 and a transverse vertical outer end wall 18. The end wall 18 cooperates with the corresponding stop lugs of the draft sills to limit outward movement of the casing. On the inner side, the end wall 18 is provided with a seat in which is disposed a wear plate 19 which presents a transverse inner friction surface. The top and bottom walls of the casing A are longitudinally slotted on the interior as indicated at 20—20 to provide longitudinally extending guideways, which cooperate with the post B in a manner hereinafter pointed out.

The post B is in the form of a longitudinally disposed column, having solid end portions connected by a longitudinally disposed vertical web 21, reinforced by horizontal ribs 22—22. The solid end portions of the post are provided with wedge faces 23—23 on opposite sides thereof, the wedge faces at each end of the post converging outwardly. The top and bottom ribs 22 extend outwardly beyond the wedge faces of the post B, thereby providing top and bottom supporting or guide ledges 24—24 at each end of the post. As is clearly shown in Figs. 2 and 3, the post is of such a height as to fit between the top and bottom walls of the casings A, and of such a width as to fit within the guideways 20 of said casings. As will be evident, the post is thus guided for true movement lengthwise of the mechanism.

The inner friction wedge, blocks C—C, are arranged in pairs at opposite ends of the mechanism, the members of each pair being disposed on opposite sides of the column and cooperating with the wedge face thereof. The blocks C are all of similar design, each having a transverse flat end face 25 which bears on the wear plate 19 of the corresponding follower casing A. At the inner end each block C has a pair of inwardly converging wedge faces 26 and 27, the wedge face 26 being disposed at a keener angle with respect to the longitudinal axis of the mechanism than the wedge face 27. The wedge face 26 of each block cooperates with the wedge face 23 at the same side of the post B. The blocks C are of such a height as fit loosely between the top and bottom walls of the casings A and the ledges 24 of the post B.

The friction wedge blocks D—D are also four in number and are arranged in pairs at opposite ends of the mechanism, the members of each pair being disposed on opposite sides of the corresponding pair of friction wedge blocks C—C. The friction wedge blocks D are all of similar design, each having a transverse, flat, inner end face 28 forming a friction surface cooperating with a spring follower plate as hereinafter more clearly pointed out. At the outer end, each block D has a pair of outwardly converging wedge faces 29 and 30. The wedge face 29 of each block D, engages the wedge face 27 of one of the blocks C at the same end of the mechanism. The outer wedge face 30 engages with wedge means on the casing A. Each casing A is provided with a pair of opposed interior wedge faces 31—31 on the opposite side walls thereof, the wedge faces 31 being disposed adjacent the outer end wall of the casing. The wedge faces 31 diverge inwardly of the mechanism and engage the wedge faces 30 of the pair of blocks D at the corresponding end of the mechanism.

The spring resistance means E comprises two pairs of spring members arranged on opposite sides of the post or column B. The members of each pair are disposed lengthwise and arranged in vertical alinement. The opposite ends of each spring member bear on spring follower plates 32—32 interposed between the ends of the springs and the wedge blocks D—D at the front and rear ends of the mechanism.

The mechanism is held of uniform over all length and the follower casings are anchored to each other by the pair of retainer bolts F—F which are disposed at opposite sides of the casings A. As most clearly shown in Fig. 1, each bolt is anchored at opposite ends to the casings A—A, the head of the bolt having shouldered engagement with a transverse abutment face 33 on the front follower casing A and the head of the bolt engaging a similar abutment surface 33 on the rear follower casing A. As most clearly illustrated in Figs. 1 and 2, the casings A are cut away at opposite sides adjacent the outer ends thereof to provide the transverse abutment faces 33. Each bolt F is arranged outwardly of the corresponding pair of spring resistance elements E, between the same and the side walls of the casings. In order to accommodate the shank of the retainer bolts, the outer wedge blocks D and the spring follower plates 32 are recessed as shown most clearly in Fig. 1.

The operation of my improved friction shock absorbing mechanism is as follows: During either a buffing or draft action, the follower casings A will be moved inwardly relatively to each other. During the relative approach of the follower casings, the wedge blocks C at opposite ends of the post B will be wedged apart, sliding laterally on the transverse friction surfaces of the casings, presented by the wear plates 19. During the lateral separation of the wedge blocks C of each pair, the wedge blocks D will be squeezed from between the wedge faces of the wedge blocks C and the casings A, thereby causing the blocks D at the front and rear ends of the mechanism to approach each other, compressing the main spring resistance elements F therebetween. As the wedge blocks D approach each other, they will also slide laterally on the spring follower plates 32, due to slippage on the wedge faces of the casings. As will be evident, in addition to the friction had on the various wedge faces of the wedge blocks and casings, additional friction is also created between the wedge blocks C and the casings and between the wedge blocks D and the spring follower plates, due to the lateral movement of the blocks during the compression of the mechanism. It is also pointed out that a differential action is had, due to the arrangement of the wedge blocks C and D, thereby effecting compression of the spring resistance elements E to a greater extent than the amount of approach of the casings A during the compression action. The compression of the mechanism will be limited by engagement of the inner ends of the casings with each other, the casings during further compression acting as a solid column to transmit the load directly to the stop lugs of the draft sills, thereby preventing excessive compression of the main spring resistance elements. The post or column B is also preferably made of such a length that the opposite ends of the same will be engaged by the end walls of the follower casings at the same time that the follower casings engage each other, the post thus assisting in transmitting the load from one casing to the other.

During release of the mechanism, when the actuating force is reduced, the expansive action of the spring resistance elements F will force the wedge blocks D outwardly, carrying the wedge blocks C and the casings A therewith and at the same time wedging the blocks C laterally inwardly to hold the same in contact with the wedge faces of the post B. Outward movement of the casings A, with respect to each other, is finally limited by the retainer bolts F, thereby also arresting outward movement of the wedge blocks C and D. As will be evident, the retainer bolts F, which are disposed at opposite sides of the casings, provide substantial and rugged means for anchoring the casings to each other without encroaching upon the available space which the parts of the shock absorbing mechanism occupy. Inasmuch as the bolts F are disposed between the members of each pair of springs, outwardly of the same, the maximum diameter of spring elements may be employed. Further, the retainer bolts do not in any way interfere with the wedge members of the shock absorbing mechanism, the outer wedge members only being slightly notched to accommodate the shanks of the bolts, thereby permitting the employment of wedge faces of maximum area. The retainer bolts not only serve to maintain the mechanism assembled but also hold the spring resistance elements E under a predetermined amount of initial compression, whereby wear of the various friction and wedge faces of the mechanism is compensated for.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with front and rear follower casings, each having a transverse friction surface and interior, opposed wedge faces of a central column disposed lengthwise of the mechanism and having wedge means at opposite ends thereof, said casings having interior, top and bottom guideways, receiving the opposite ends of the column and guiding the same lengthwise of the mechanism; a pair of inner wedge blocks at each end of the mechanism, each pair having wedging engagement with the corresponding end of the column and frictional engagement with the transverse friction surface of the corresponding casing; and an outer pair of wedge blocks at each end of the mechanism having wedging engagement with the corresponding pair of inner wedge blocks and also having wedging engagement with the wedge faces of the casing at that end of the mechanism; a pair of spring resistance elements at each side of the column interposed between the front and rear follower casings and cooperating with the outer wedge blocks; and a retainer bolt at each side of the mechanism disposed outwardly of the corresponding pair of spring elements between the top and bottom members of said pair, each of said bolts being anchored to the front and rear follower casings respectively and holding the mechanism assembled.

2. In a friction shock absorbing mechanism, the combination with front and rear follower casings having spaced side walls, spaced top and bottom walls, the side walls being provided with interior opposed wedge faces; of a central column having a pair of wedge faces at each end, the opposite ends of said column being telescoped within the follower casings; a pair of friction wedge blocks at each end of the column disposed at opposite sides of the same and having wedging engagement with the corresponding wedge faces of said column, said blocks having friction surfaces at the outer ends thereof having frictional engagement with the interior surface of the transverse end wall of the corresponding casing; an outer pair of wedge blocks at each end of the mechanism disposed at opposite sides of the first named pair of blocks and having wedging engagement therewith, said outer blocks having wedging engagement with the casing wedge faces, each of said outer blocks occupying substantially the entire space between the top and bottom walls of said casings; a pair of vertically alined springs at each side of the column interposed between the front and rear outer blocks; and tie means anchored to the front and rear casings at opposite sides of the mechanism, said tie means being disposed between the corresponding pair of springs at the outer sides thereof, and said outer pairs of wedge blocks being recessed to accommodate said tie means.

In witness that I claim the foregoing I have hereunto subscribed my name this 15th day of May, 1929.

STACY B. HASELTINE.